United States Patent

[11] 3,610,269

| [72] | Inventor | Donald L. Adams |
| | | Rolling Hills, Calif. |
| [21] | Appl. No. | 28,286 |
| [22] | Filed | Apr. 22, 1970 |
| [45] | Patented | Oct. 5, 1971 |
| [73] | Assignee | Diamond-U Products, Inc. |
| | | Long Beach, Calif. |
| | | Continuation of application Ser. No. |
| | | 755,202, Aug. 26, 1968, now abandoned. |

[54] PRESSURE GAUGE AND VALVE FOR A TIRE
1 Claim, 2 Drawing Figs.

[52] U.S. Cl. .................................................... 137/227,
137/557, 73/146.8, 116/34
[51] Int. Cl. ...................................................... F16k 15/20
[50] Field of Search .......................................... 137/227;
73/146.3, 146.8, 419; 116/34 A

[56] References Cited
UNITED STATES PATENTS

| 1,346,961 | 7/1920 | Jackson ......................... | 137/227 X |
| 1,482,947 | 2/1924 | Shorts ........................... | 137/227 |
| 3,230,968 | 1/1966 | Struby ........................... | 137/227 |
| 3,246,679 | 4/1966 | Stealy ........................... | 137/227 X |

Primary Examiner—Harold W. Weakley
Attorney—Brumbaugh, Graves, Donohue & Raymond ABSTRACT: A pressure gauge and valve for a tire which includes a housing adapted to be force fitted in the wall of a tire, an open receptacle in the outer end of the housing, a passage establishing communication through the housing between the tire and the receptacle, a spring-urged plunger accommodated for movement within the receptacle, the position thereof indicating the tire pressure, a valve through which the tire is inflated accommodated within the plunger, and cooperating valve head and valve seat formations on the plunger and receptacle to form a seal when the tire pressure falls below a predetermined level.

PATENTED OCT 5 1971  3,610,269

INVENTOR.
DONALD L. ADAMS
BY Brumbaugh, Graves, Donohue & Raymond
his ATTORNEYS

PRESSURE GAUGE AND VALVE FOR A TIRE

This is a continuation of application, Ser. No. 755,202, filed Aug. 26, 1968, now abandoned.

The invention relates to a novel pressure gauge and valve assembly which is adapted to be force fitted in the wall of a tire and which incorporates a valve for inflating the tire, a pressure gauge for indicating the tire pressure, and a safety valve which closes and prevents further leakage from the tire when the tire pressure falls below a predetermined level.

The pressure gauge and valve of the present invention is of simple, inexpensive and rugged construction, is small and light in weight so as not to affect tire balance or create undesirable vibrations at turnpike speeds, and when subjected to normal use will provide dependable service throughout the life of the tire. Nevertheless, in the event it is damaged it can be readily replaced.

Figure 1:
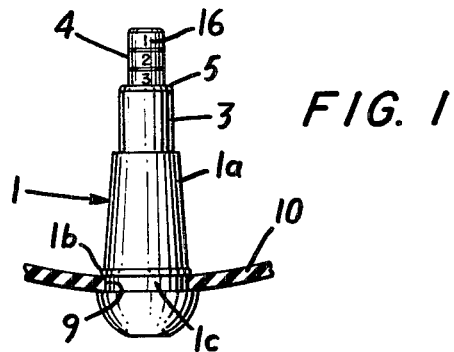
Figure 2:
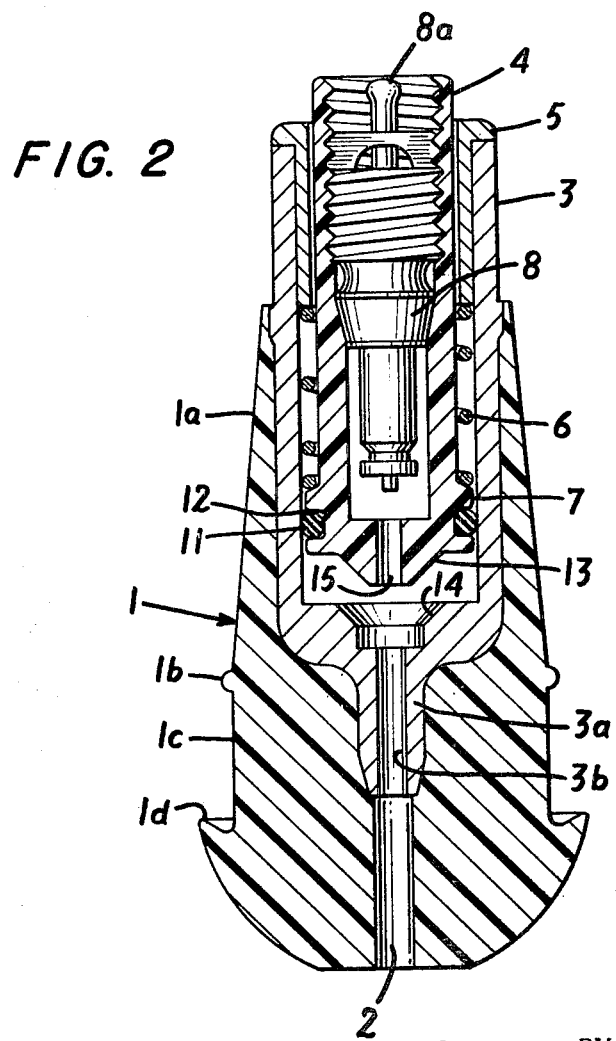

For a more complete understanding of the invention reference can be made to the detailed description which follows and to the accompanying drawings in which:

FIG. 1 is an elevational view of the tire pressure gauge and valve of the present invention shown force fitted in a wall of a tubeless tire; and FIG. 2 is a vertical cross-sectional view.

The pressure gauge and valve assembly of the present invention, as best shown in FIG. 2, includes a resilient housing 1 having a hollow upper end and an airflow passage 2 extending through the lower end thereof, a relatively rigid cup-shaped receptacle 3 snugly fitted in the open upper end of the housing and having a depending extension 3a with an airflow passage 3b therethrough which communicates with the passage 2, a hollow plunger 4 accommodated for movement within the cup-shaped receptacle 3, a spring-retaining and plunger-guiding plug 5 press-fitted into the open upper end of the cup-shaped receptacle 3, a coil spring 6 compressed between the lower end of the plug and an outwardly projecting spring-retaining formation 7 on the plunger 4, and a tire-inflating valve 8 threaded within the hollow plunger 4.

The outer surface of the resilient housing 1 includes a tapered conical upper end 1a, an annular protruding rib formation 1b beneath the tapered portion, a cylindrical section 1c beneath the rib formation, and an enlarged lower end which forms an outwardly extending shoulder 1d spaced from the rib formation 1b by approximately the width of the wall of the tire in which it is to be inserted. The housing is forced into the aperture 9 of the tire 10, and when it is in proper position it is locked by the rib formation 1b and the shoulder 1d with the cylindrical section 1c in tight fitting and sealing relationship with the wall defining the aperture 9.

The movable plunger 4 is preferably made of lightweight plastic material and carries an airtight sealing ring 11 in a groove 12 in the outer periphery of the lower end below the formation 7. This seal prevents loss of air from the interior of the tire between the plunger 4 and the cup-shaped receptacle 3. Passage of air through the plunger is prevented by the normally closed valve 8 therein.

In the event that the seal 11 should leak or become damaged, provision is made for automatically sealing the passage 3b. Toward this end, the lower end of the plunger 4 is shaped in the form of a valve head 13 and a complementary-shaped valve seat 14 is formed within the cup-shaped receptacle 3. When the air pressure within the tire falls to a predetermined value the valve head 13 will be forced by the compressed spring 6 into engagement with the valve seat 14, preventing further escape of air from the tire.

The tire is inflated by the flow of air through the plunger 4 and the normally closed valve 8 accommodated therein. As in conventional tire inflating valves, the valve 8 opens upon depression of the valve stem 8a to permit air to be introduced into the tire. A passage 15 in the loser end of the plunger 4 permits the flow of air into the tire through the passages 3b and 2 even when the valve head 13 of the plunger 4 is in sealing engagement with the valve seat 14 of the cup-shaped element 3.

As the tire is inflated, the air pressure will force the plunger 4 upwardly against the force exerted by the compression spring 6, causing the plunger to rise as a function of the increase in air pressure within the tire. The upper end of the plunger protrudes above the plug 5, and a scale 16 is marked on the outer periphery thereof to serve as a pressure indicator so that the tire pressure can be read from the scale.

The invention has been shown in preferred form and by way of example only, and obviously many variations and modifications may be made therein without departing from the spirit of the invention. The invention, therefore, is not to be limited to any specified form or embodiment, except insofar as such limitations are set forth in the claims.

I claim:

1. A pressure gauge and valve for a tire comprising a resilient housing (1), locking formations (1b, 1d) on the outer periphery of the housing interlocking and sealing with a wall of the tire, an open cup-shaped receptacle in the outer end of said housing, a relatively rigid cup-shaped element (3) snugly fitted within said receptacle, an integrally formed extension (3a) depending from the bottom of the cup-shaped element, a passage (2) through the housing establishing communication between the interior of the tire and the receptacle, a passage (3b) through the extension forming part of the said passage (2) and communicating with the interior of said cup-shaped element, a movable plunger (4) accommodated within the cup-shaped element, a spring (6) urging the plunger into the cup-shaped element against the pressure within the tire, cooperating valve head and valve seat formations (13, 14) on the end of the plunger and on the surface of the cup-shaped element surrounding the end of the passage which are normally spaced apart when the tire is inflated but which are movable by the spring into sealing engagement when the pressure within the tire falls to a low level, a passage (15) through the plunger and a one-way valve (8) within the passage through the plunger for inflating the tire and preventing airflow from the tire, the pressure within the tire displacing the plunger against the force exerted by the spring so that the position of the plunger indicates the pressure within the tire and the valve head and valve seat formations on the plunger and the cup-shaped element to prevent escape of air from the tire between the plunger and the receptacle when the air pressure within the tire falls to a low level.